United States Patent [19]

Nakamura

[11] Patent Number: 4,987,349
[45] Date of Patent: Jan. 22, 1991

[54] INFRARED REMOTE CONTROL TOY

[75] Inventor: Yoshio Nakamura, Tokyo, Japan

[73] Assignees: Hokuko Sangyou Limited Responsibility Company; Alps Shoji Company Limited, both of Tokyo, Japan

[21] Appl. No.: 382,204

[22] Filed: Jul. 19, 1989

[30] Foreign Application Priority Data

Jul. 20, 1988 [JP] Japan .............................. 63-96901[U]

[51] Int. Cl.⁵ .............................................. H02P 1/22
[52] U.S. Cl. ...................................... 318/293; 318/16; 318/480; 446/175; 446/454
[58] Field of Search ......................... 318/16, 293, 480; 446/90, 175, 448, 454, 455, 456, 457, 460, 465, 484, 491; 455/600, 603, 613

[56] References Cited

U.S. PATENT DOCUMENTS

| 4,086,724 | 5/1978 | McCaslin | 446/175 |
| 4,217,528 | 8/1980 | Scheying et al. | 318/293 |
| 4,371,814 | 2/1983 | Hannas | 318/480 X |
| 4,584,504 | 4/1986 | Lee et al. | 318/16 |
| 4,618,804 | 10/1986 | Iwasaki | 318/16 |
| 4,754,133 | 6/1988 | Bleich | 455/603 X |
| 4,828,525 | 5/1989 | Okano | 446/175 |

FOREIGN PATENT DOCUMENTS 56-94983 7/1981 Japan .............................. 318/293

Primary Examiner—Bentsu Ro
Attorney, Agent, or Firm—Kanesaka and Takeuchi

[57] ABSTRACT

An infrared remote control toy which needs a small amount of motor starting current includes a logic IC and a motor drive circuit consisting of four transistors connected in the form of a bridge, in which the bases of the third and fourth transistors are connected to the first and second junctions of the bridge.

2 Claims, 3 Drawing Sheets

INFRARED REMOTE CONTROL TOY

BACKGROUND OF THE INVENTION

This invention relates to infrared remote control toys and, more particularly, to an infrared remote control toy which needs only a low-capacity power source for starting the electric motor.

Some conventional infrared remote control toys have a motor driving circuit and a logic integrated circuit for controlling the driving circuit. However, in the conventional configuration of such a logic IC and a driving circuit there is always a considerable amount of current flowing from the logic IC into the driving circuit no matter the output of the logic IC is high or low.

SUMMARY OF THE INVENTION

Accordingly, it is an object of the invention to provide an infrared remote control toy which needs a small amount of starting current for the electric motor, thereby making a miniaturized infrared control toy possible.

In accordance with the invention there is provided an infrared remote control toy which includes a light receiving element mounted on a toy body for receiving infrared light to provide an electric signal; a logic integrated circuit mounted within the toy body for receiving the electric signal to provide a motor driving signal; and a motor driving circuit for receiving the motor driving signal to thereby control the electric motor of the toy.

In accordance with an embodiment of the invention, the motor driving circuit consists of a pair of a series connection of first and third transistors and a series connection of second and fourth transistors, with the electric motor connected across a first junction between the first and third transistors and a second junction between the third and fourth transistors, in such a manner that the bases of the third and fourth transistors are connected to the second and first junctions, respectively.

Other objects, features, and advantages of the invention will be apparent from the following description taken in conjunction with the accompanying drawings.

DESCRIPTION OF THE PREFERRED EMBODIMENT

Figure 1:
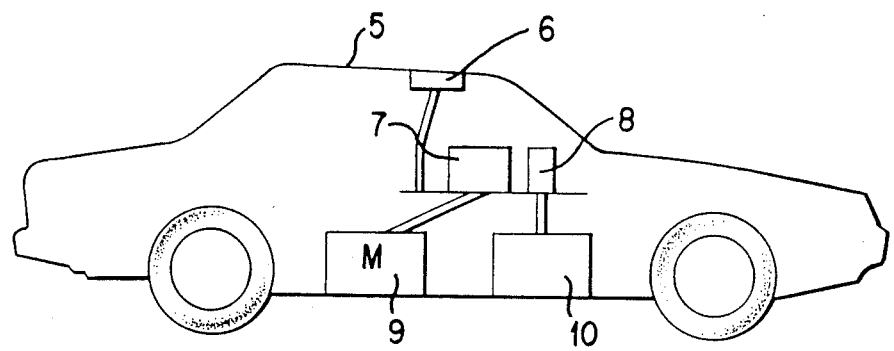
FIG. 1 is a side view of an automobile toy according to an embodiment of the invention.

In FIG. 1, the automobile toy includes a body 5 in which a light receiver 6, a logic integrated circuit 7, a driver circuit 8, an electric motor 9, and a battery cell 10 are mounted as shown.

Figure 2:
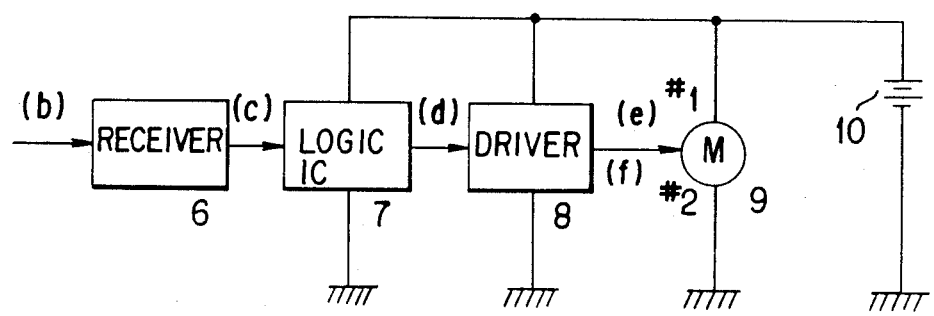
FIG. 2 is a block diagram of the electrical circuitry of the automobile toy of FIG. 1.

In FIG. 2, the electric circuitry consisting of the above components 6-10 for driving the motor 9 is shown in the order of a signal flow.

Figure 3:
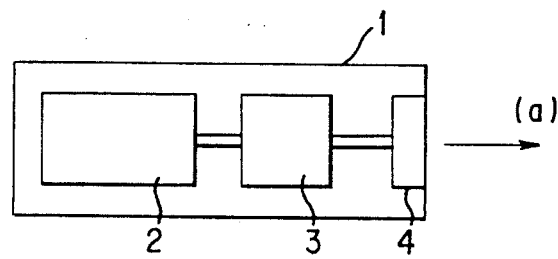
FIG. 3 is a side view of a transmitter for useful for the automobile toy of FIG. 1.

In FIG. 3, a trnasmitter includes a case 1 in which a power source 2, an oscillator 3, and a light emitting element 4 are mounted as shown. The light emitting element 4 is designed to transmit a light sigal (a) having a wavelength between 850 nm and 970 nm, for example.

Figure 4:
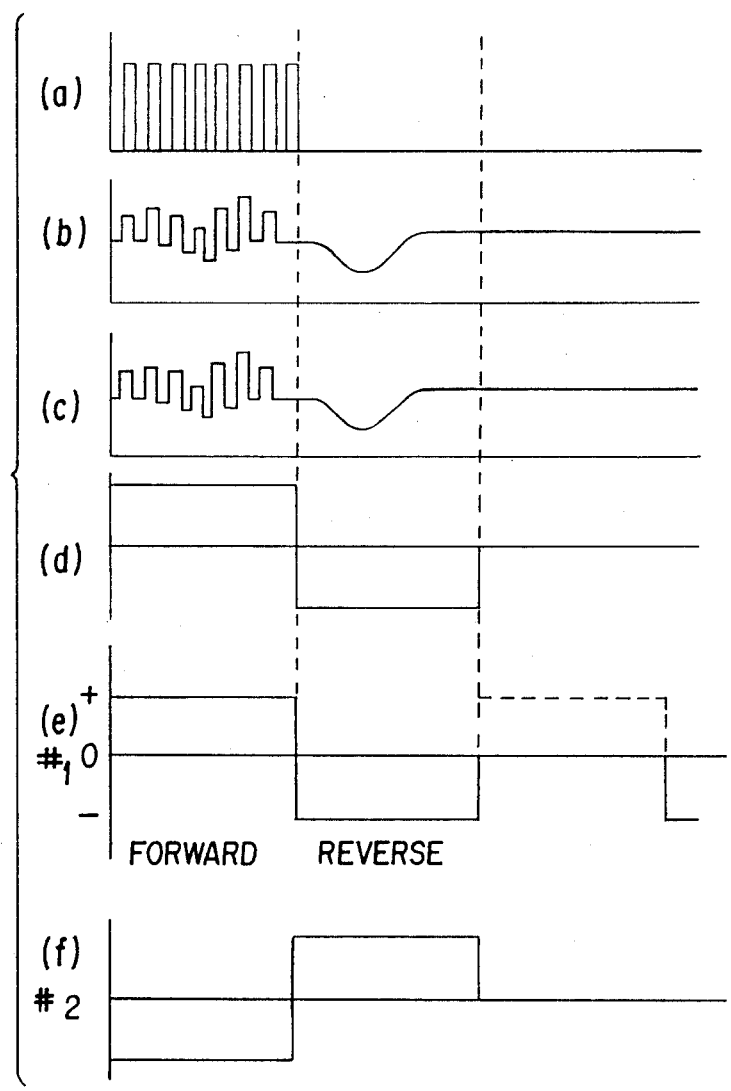
FIG. 4 is graphs showing respective waveforms at various points of the electrical circuitry of FIG. 2.

The waveforms obtained at respective points (a) through (f) of FIGS. 2 and 3 are shown in FIG. 4.

Figure 5:
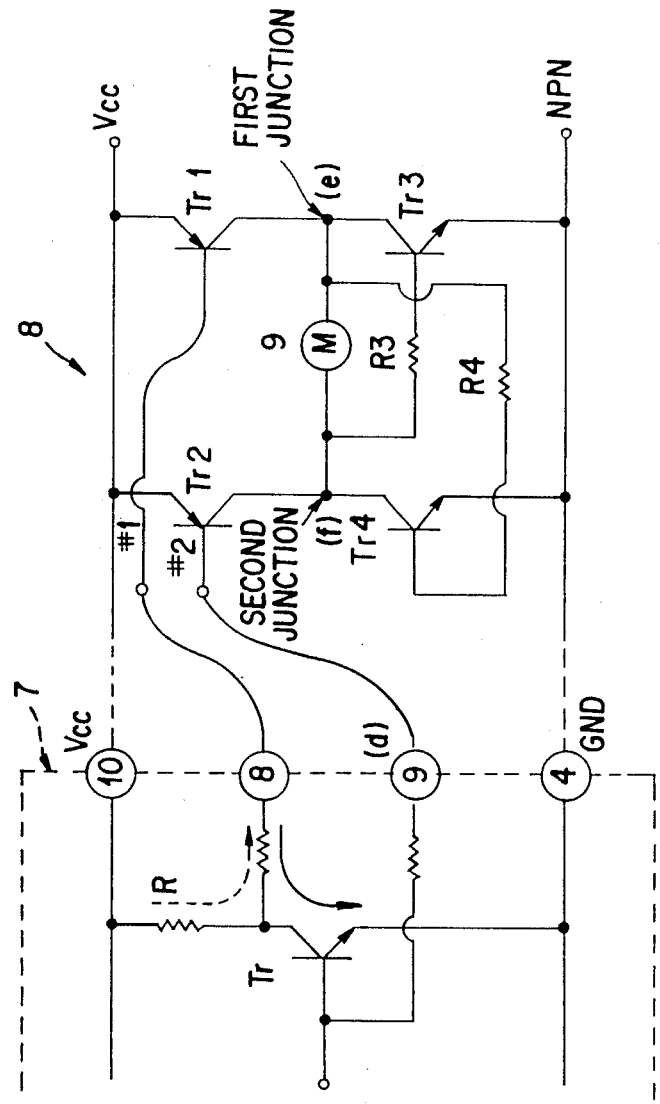
FIG. 5 is a schematic diagram of the output section of a logic integrated circuit through a motor of the automobile toy of FIG. 1.

The output section of the logic IC 7 through the electric motor 9 in FIG. 2 is shown in detail in FIG. 5. Four transistors Tr1-Tr4 are connected in a bridge configuration, with a pair of opposite junctions connected across the power source Vcc. The electric motor M is connected across the other pair of opposite junctions #1 and #2. The base of the transistor Tr3 is connected to the junction #2 via a resistor R3 while the base of the transistor Tr4 is connected to the junction #1 via a resistor R4. The respective bases of the transistors Tr1 and Tr2 are connected to the input terminals #1 and #2.

In operation, when an operator turns on the transmitter 1 for a while and then turns it off, the transmitter 1 emits a light signal such as shown at (a) in FIG. 4. The receiver 6 on the automobile toy receives the light signal (b) transmitted through air and outputs an electrical signal (c) which has a waveform similar to that of the light signal (b). The logic IC 7 receives the electrical signal (c) and outputs a flat high-level signal during the on period and a flat low-level signal during the off-period as shown at (d) in FIG. 4.

When the output terminal #9 of the logic IC 7 and the input terminal #2 of the driver circuit 8 in FIG. 5 are high, the transistor Tr is turned on, bringing a terminal #1 to a low level. Thus, the input terminals #1 and #2 of the driver circuit 8 are at low and high levels. Consequently, the transistors Tr1 is turned on, bringing the junction #1 up to almost Vcc. As a result, the base of the transistor Tr4 becomes high, turning on the transistor Tr4 to thereby supply the electric motor 9 with electric current in the direction from the transistor Tr1 to Tr4 (the automobile toy moves forward). If the electric motor 9 needs 400 mA and the amplification factor of each transistor Tr1, Tr2 is 100, then the input current must be 4 mA.

Then, when the output terminal #9 of the logic IC 7 and the input terminal #2 of the driver circuit 8 become low, the transistor Tr2 is turned on, bringing the junction #2 to a high level, which turns on the transistor Tr3. As a result, electric current flows through the electric motor in the direction from the transistor Tr2 to Tr3 (the automobile toy moves backward).

In this way, only when the input terminals #1 or #2 is low, the transistor Tr1 or Tr2 is turned on, so that no current flows when the input terminal is high, thus eliminating the wasteful current which flows in the conventional circuit even when the input terminal is high.

With above combination of the logic IC and the driver circuit, it is possible to drive the electric motor for about 30-40 minutes with a U-5 nickel cadmium cell which drives the conventional infrared remote control for only about 30-40 seconds. Thus, with the remote control unit according to the invention, it is possible to start the electric motor with a battery as small as a U-5 cell, thus making a miniaturized infrared remote control toy possible.

While a preferred embodiment of the invention has been described using specific terms, it is to be understood that changes and variations may be made without departing from the spirit and scope of the invention as recited in the appended claims.

What is claimed is:

1. An infrared remote control toy comprising:
    a toy body having an electric motor mounted in said toy body for moving the same, a light receiving element mounted on the toy body for receiving infrared light to provide an electrical on/off signal, and a power source,
    an integrated logic circuit mounted in the toy body for receiving the electrical on/off signal from the light receiving element, said integrated logic circuit having a first terminal for providing a forward driving signal, a second terminal for providing a rearward driving signal, and a transistor connected across the power source and having a collector connected to the first terminal and a base connected to the second terminal, said base receiving a signal corresponding to the electrical on/off signal from the light receiving element, and
    a motor driving circuit mounted in the toy body and including a pair of a series connection of first and third transistors and a series connection of second and fourth transistors connected across the power source, said electric motor being connected across a first junction between the first and third transistors and a second junction between the second and fourth transistors such that bases of the third and fourth transistors are connected to the second and first junctions, respectively, and bases of the first and second transistors being connected to the first and second terminals of the integrated logic circuit, respectively so that the motor driving circuit operates at low electricity supplied from the logic circuit in both forward and rearward drivings.

2. The infrared remote control toy of claim 1, wherein said light receiving element is especially sensitive at wavelengths between 850 nm and 970 nm.

* * * * *